INVENTOR.
Edward J. Fitz

INVENTOR.
Edward J. Fitz

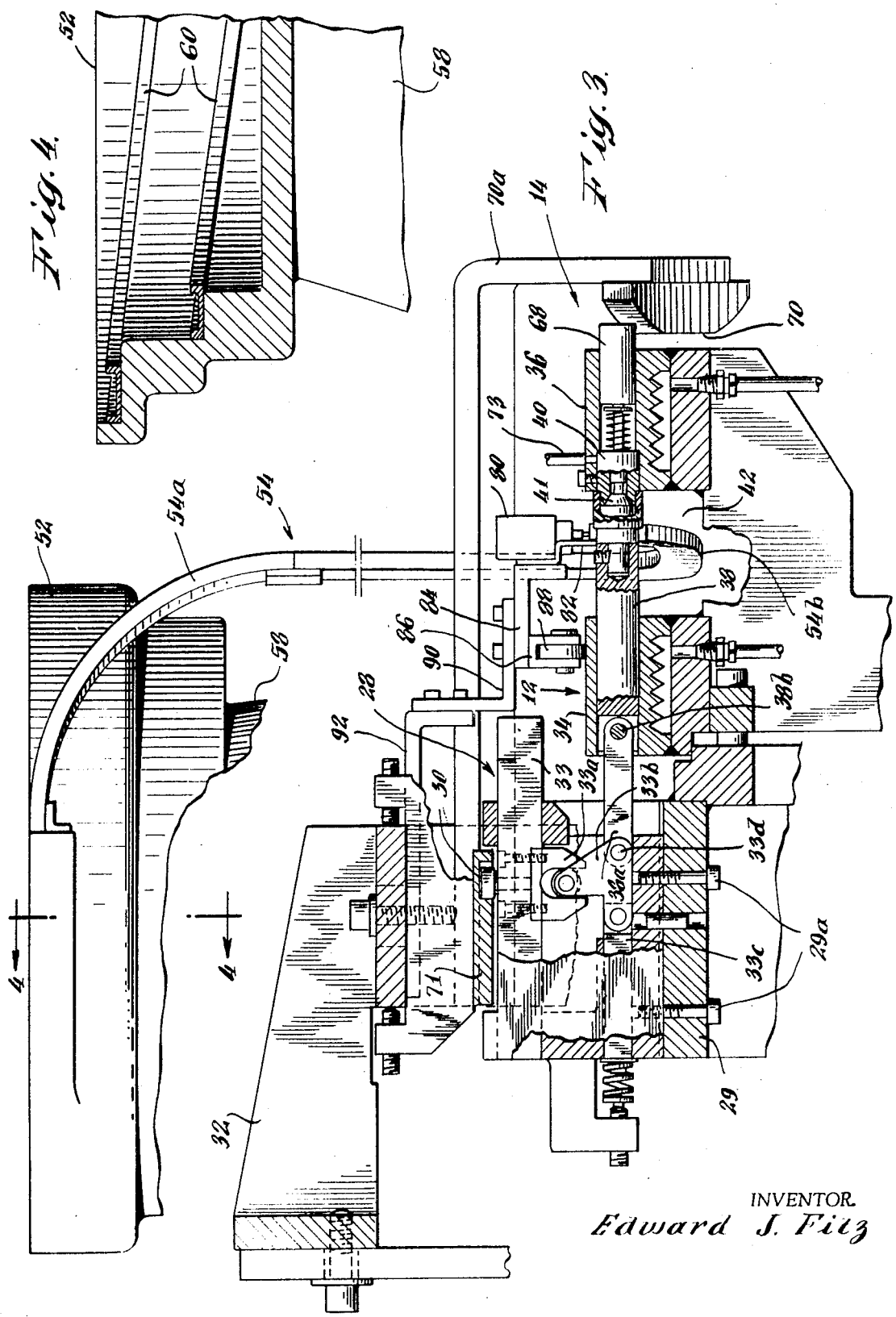

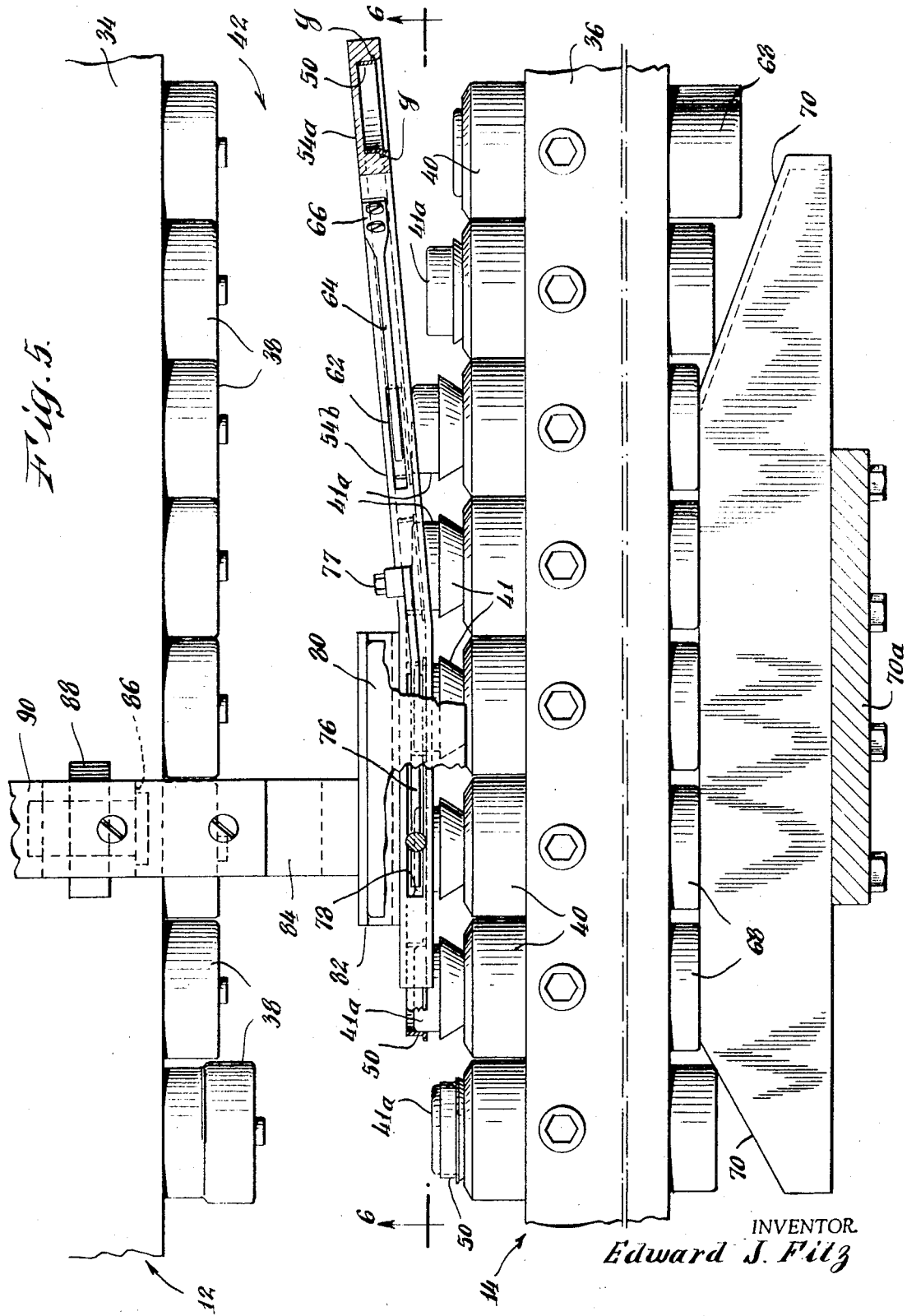

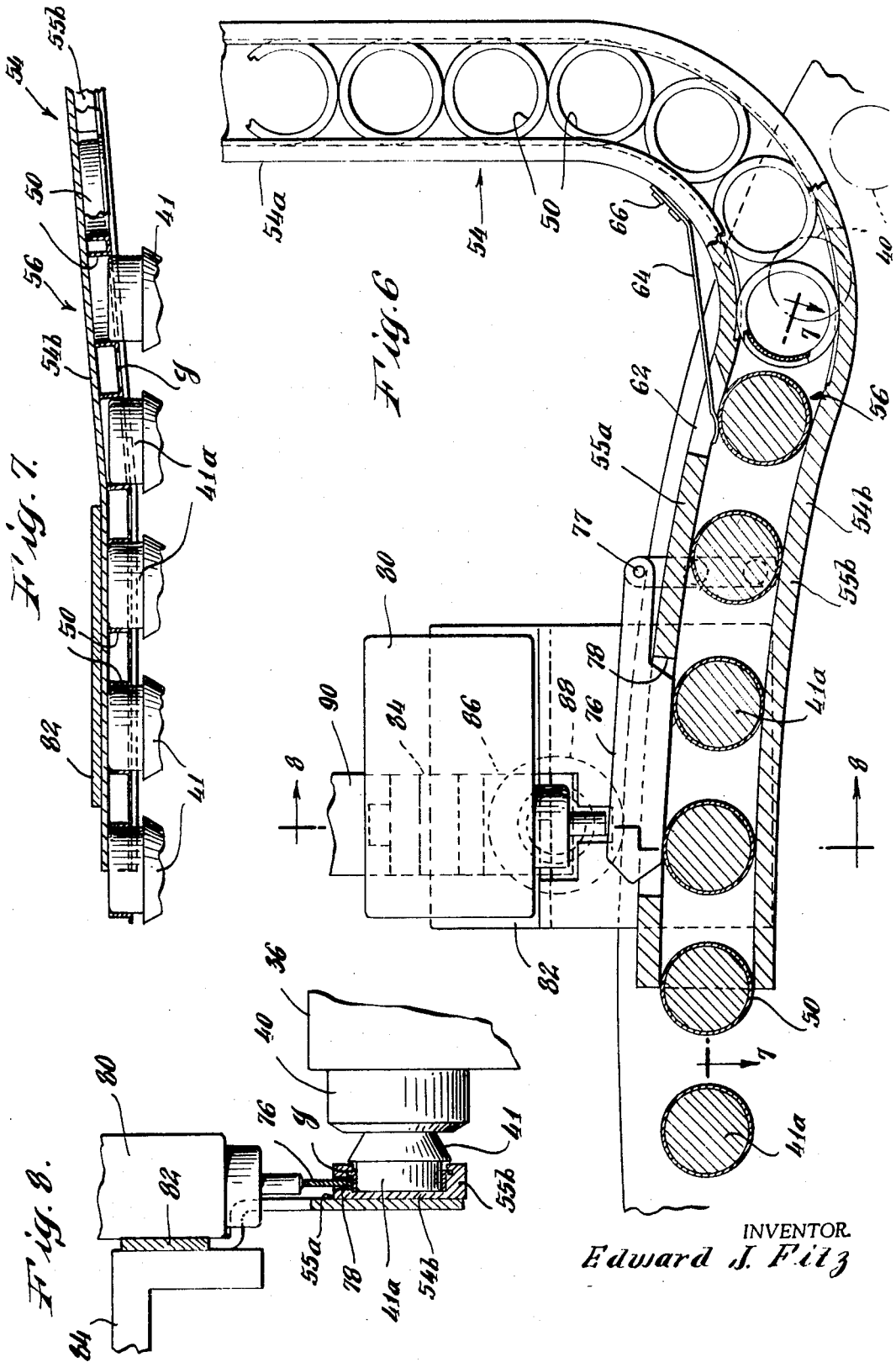

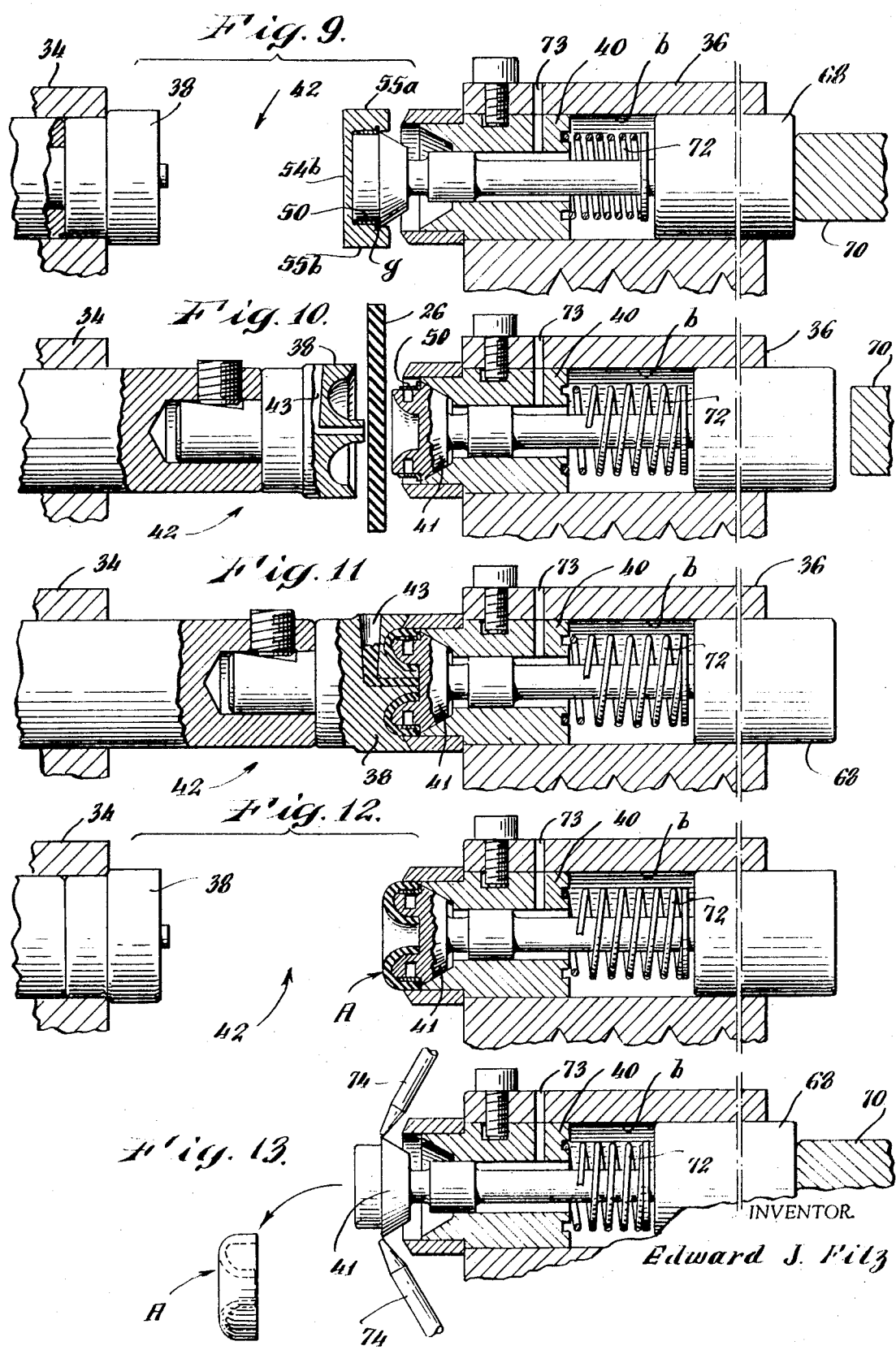

United States Patent Office 3,651,190
Patented Mar. 21, 1972

3,651,190
MANUFACTURE OF COMPOSITE ARTICLES OF MOLDABLE AND NONMOLDABLE MATERIALS
Edward J. Fitz, Fairfield, Conn., assignor to Eagle-Picher Industries, Inc.
Continuation of application Ser. No. 674,363, July 3, 1967, which is a division of application Ser. No. 422,354, Dec. 30, 1964, now Patent No. 3,335,458. This application Mar. 10, 1970, Ser. No. 17,047
Int. Cl. B29d 3/00
U.S. Cl. 264—153
4 Claims

ABSTRACT OF THE DISCLOSURE

Forming a plurality of composite articles by consecutively feeding nonmoldable members into cooperating blanking dies. A projecting portion of one of the dies contacts the leading edge of an inclined nonmoldable member stopped in a chute and moves the nonmoldable member through the end of the chute while seating the member in the projecting die portion. The projecting die portion and member are then retracted and the dies cooperative to blank molding material from a strip and to mold the material against the nonmoldable member. The dies then open and the projecting portion ejects the composite article.

---

This application is a continuation of application Ser. No. 674,363, filed July 3, 1967, now abandoned, which is a division of application Ser. No. 422,354, filed Dec. 30, 1964, now Pat. No. 3,335,458.

This invention relates to method and apparatus for producing composite articles including a nonmoldable portion and a molded portion of determinate volume, size and shape, and position relative to the unmoldable portion. An important feature of the invention is the feeding of the members which form the nonmoldable portions of the resulting composite articles.

The invention is described herein in its application to making a brake cylinder boot.

An object of the invention is to provide an operation in which rings, caps and the like may be continuously supplied to, and properly positioned within, a succession of mold cavities.

Another object of the invention is to feed and present nonmoldable members so that they may be entered into a moving succession of mold cavities, and disposed therein accurately in a predetermined position, at high speed.

Another object of the invention is to provide coacting means by which the accurate positioning of non-moldable inserts within a series of moving mold cavities is determined and accomplished before the inserts enter into the respective cavities.

A further object of the invention is the provision of improved method for making composite articles comprising molded and nonmoldable parts.

Figure 1:
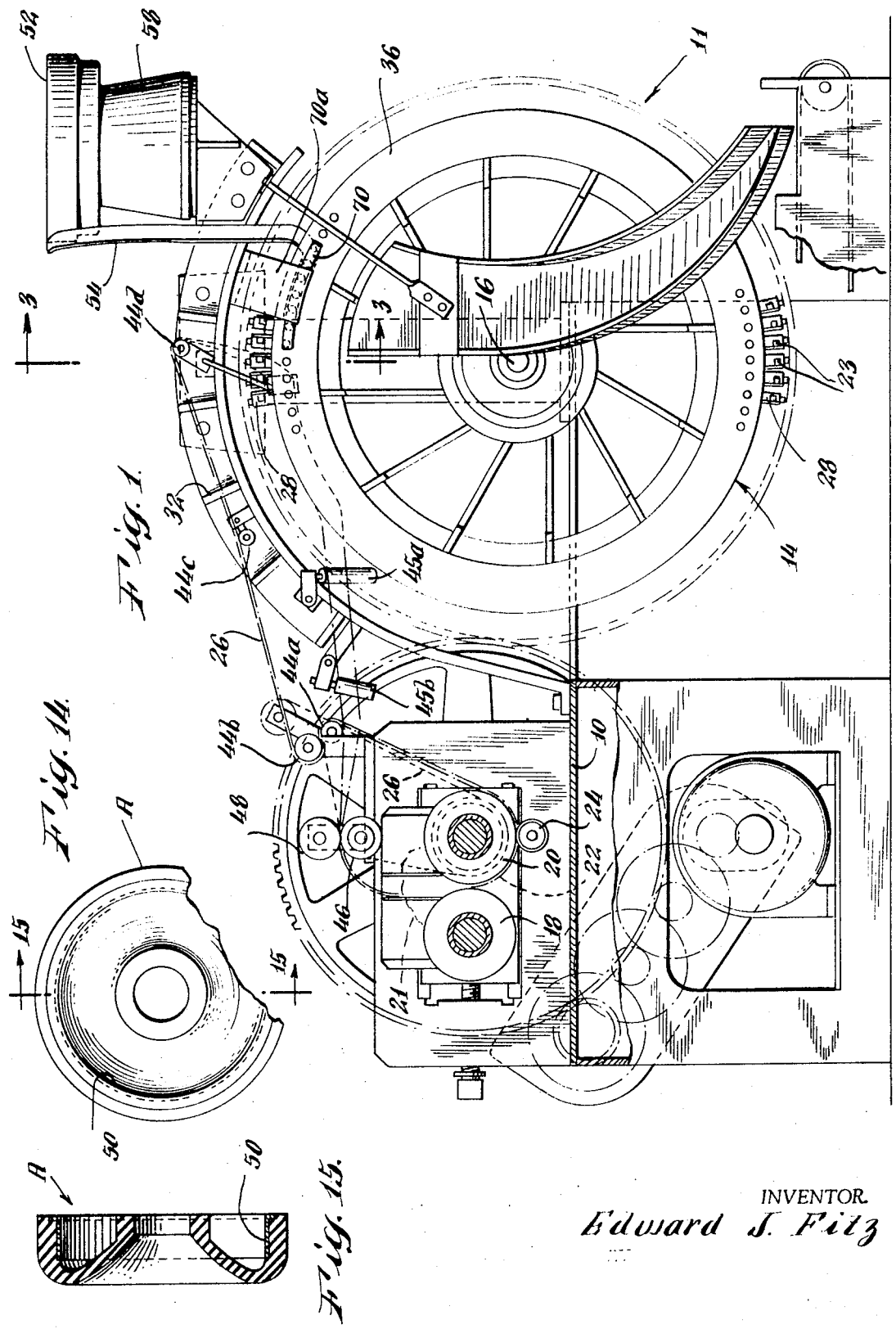
Figure 2:
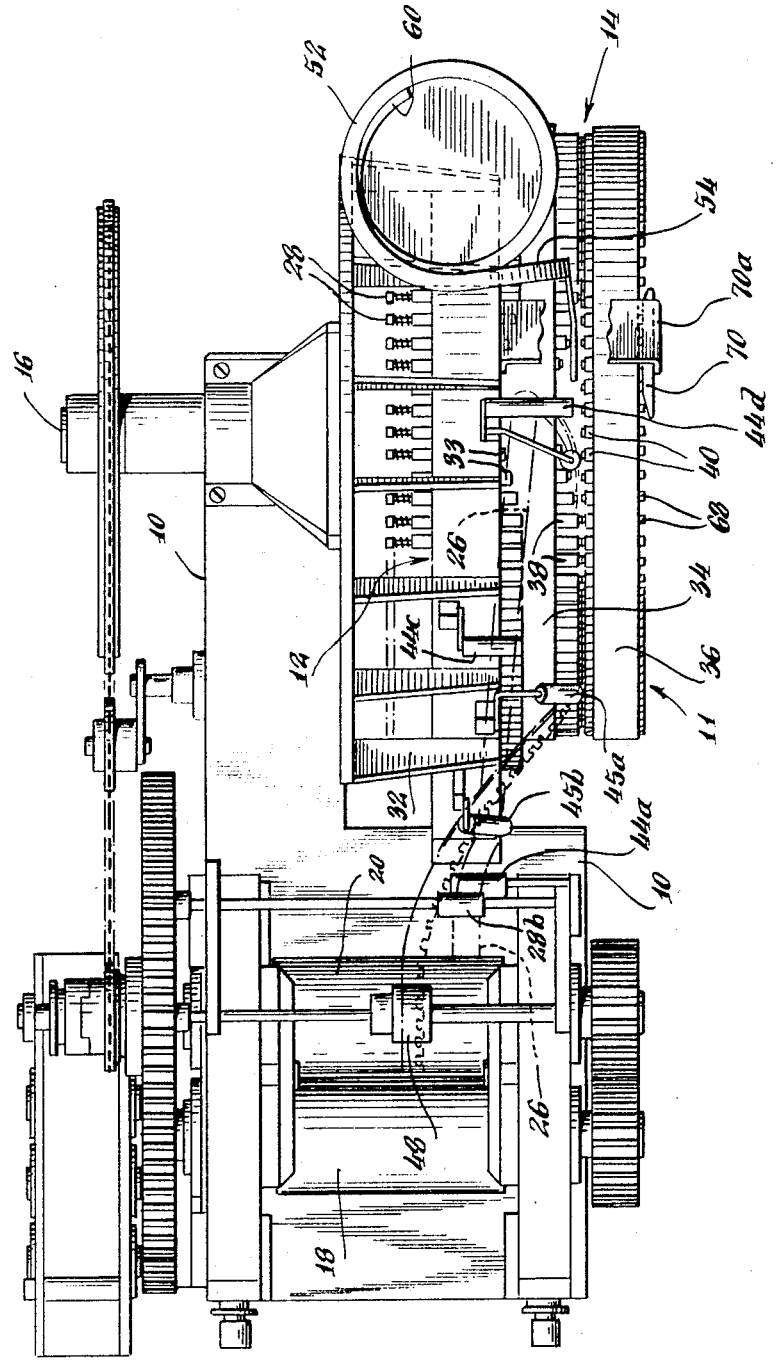

The invention will best be understood by reading the following description in connection with the drawings, in which, FIG. 1 is a side view of the molding machine embodying the invention, indicating the arrangement of the forming dies in a cyclic path showing the present invention as applied thereto, FIG. 2 is a plan view of the embodiment of the invention shown in FIG. 1, FIG. 3 is an end view, partly in section and partly broken away, taken on the line 3—3 of FIG. 1, FIG. 4 is a detail view of the hopper for feeding nonmoldable articles to a loading station in forming a composite article, taken on the line 4—4 of FIG. 3, FIG. 5 is a detail plan view showing on an enlarged scale the feed chute or track entering into the loading station between the two die containing rings of the cyclic mold wheel, showing a moving part of a cavity forming die projected into the track into contact with the leading edge of one of the members being fed, FIG. 6 is a side elevation taken on the line 6—6 of FIG. 5, FIG. 7 is a detail plan view taken on the line 7—7 of FIG. 6, FIG. 8 is a detail view partly in section taken on the line 8—8 of FIG. 6.

FIGS. 9–13 show the progression of the movements of a pair of dies during a die closing and die opening cycle, after a nonmoldable member has left the chute and become seated on the movable portion of a hollow cavity defining die member; FIG. 9 showing the movable portion of the hollow cavity defining die members being retracted after having picked up a nonmoldable member; FIG. 10 showing a strip of moldable material in position between the die members, with the movable die partly projected, and the movable portion of the stationary cavity defining die fully retracted; FIG. 11 showing the closed position of the die members after punching out a strip of moldable material and seating it in the die cavity aaginst the nonmoldable member therein; FIG. 12 shows the die members separated after the molding operation; and FIG. 13 shows a composite article just after separation from the movable portion of the stationary cavity defining die, which has been again projected for this purpose.

FIG. 14 illustrates a composite article resulting from the molding operation, and FIG. 15 is a section taken diametrically of the composite article, on the line 15—15 of FIG. 14.

In forming composite articles in accordance with the embodiment of the invention disclosed herein nonmoldable members are fed down and along a chute and are transferred into the hollow die members of an endless series of pairs of axially aligned cooperating die members. Slugs of moldable material are then inserted into the hollow die members and the dies are closed and the slugs are molded against the nonmoldable members, and the resulting composite articles are ejected. During the feeding of the nonmoldable members, portions of the hollow die members are projected into contact with the leading edges of the nonmoldable members respectively, and serve to move the nonmoldable members through the remaining length of the chute during which movement the members become fully seated on the hollow die portions. Upon reaching the end of the chute the hollow die portions are retracted carrying with them the nonmoldable members which thus become fully seated within the hollow die members. After the filling of the hollow die members with slugs of moldable material, the closing of the dies, and the molding operation, the resulting composite articles are ejected, the hollow die portions being again projected in accomplishing the ejection of the articles.

The invention disclosed herein applies particularly to the methods and apparatus disclosed in Cora No. 2,943,-354 in which an endless series of pairs of axially aligned cooperating dies close successively upon a ribbon of moldable material and blank therefrom a quantity of material which is then molded within the cavity formed by the dies. The apparatus comprises a drum-like carrier having two parts 12 and 14 coaxially mounted on a shaft 16 for rotation about a horizontal axis and supported at one end of a base or frame 10. At the other end of the base or frame there is mounted a pair of mill rollers 18 and 20 which, drawing from a quantity or bank 21 of moldable material, such as uncured rubber or other thermoplastic material, forms on the roller 20 an enveloping layer 22 of determinate thickness controlled by the spacing between the rollers of the mill. A rotary cutter 24 removes from the layer 22 a strip 26 of determinate width, the void in the layer 22 being constantly filled by migration of the material from the bank 21 so that strip 26 is continuous so long as the bank is maintained by replenishing material and the machine is operated.

Part 12 of the carrier has removably mounted on its periphery a series of actuating units 28 closely spaced and each including a cam follower 30. Secured to the frame 10 and overlying the carrier part 12 is an arcuate cam support 32 on which suitable cams are adjustably mounted to be engaged by the follower 30 as the carrier part 12 rotates.

Mounted on part 14 of the carrier are two spaced ring members 34 and 36 in which, extending around their peripheries respectively, are series of pairs of forming die members 38 and 40, which are spaced apart and axially aligned. The dies of each pair may be separated and brought together and form between them a molding cavity defining the contour of the article to be formed therein. Each pair of the forming dies 38 and 40 constitutes, together with their actuating units 28, what is herein termed a molding unit, there being a continuous succession of such units mounted around the carrier and travelling in a closed path.

As shown, the die members 38 are mounted to move axially and horizontally toward and away from the die members 40, and each die member 38 is connected to an axially aligned actuating unit 28 by which it is operated when the cam follower 30 reaches and is operated by the cam on the cam support 32 during the rotation of the carrier drum 11.

In the open position of the die members 38 and 40 there is a space 42 (see FIGS. 5 and 10) between the die members 38 and 40, and it is into this space that first, the nonmoldable members are fed and then inserted into the cavity defining dies 40 as will be further described, and second the strip 26 is guided from the mill unit M by guides 44a and 44b, 44c and 44d, set at such angles that the horizontally disposed strip is twisted to lie in a vertical plane when entering the space 42 between the die members substantially tangentially to the cyclic path of the molding units. When so located, movement of the die members 38 to cavity-closing position successively engages the strip 26 and presses it against the die members 40, as shown in FIG. 11, with sufficient force to sever blanks from the strip and to forcibly fill the molding cavities formed by the die members. At the same time the strip 26, which is somewhat wider than the working ends of the two die members 38 and 40, is impaled on the die member which penetrates it and is carried along for a short distance with the carrier 11 by the die members. For semi-curing the formed articles, the die members 38 and 40 are heated by conduction or otherwise through their supporting means in any desired manner.

The strip 26 is carried along with the die members only so long as is necessary to control the strip and blank-out the required amount of material. That is to say, the strip is diverted from the cyclic path of the die members as soon as it is practical after the blank to form the article has been cut, preferably after only a few succeeding die members have thus impaled the strip. After blanking, in order to so divert the strip, it is pulled or peeled off the die members tangentially away from their cyclic path, while the die members remain closed.

The skeletonized strip travel back to the bank 21 in the mill M on the mill rollers 18 and 20, there to commingle with the material of the bank, the strip being assisted in its return movements by guide rollers 45a and 45b, and by power-driven feed roller 46 and pressure roller 48 engaging it.

In the precision molding operation of the present machine, the formed blanks are left enclosed in the die members along with the inserts 50 for a determined time, so that the moldable material may continue to be subjected to heating sufficient to cause the molding material to flow against, and adhere to, the nonmoldable inserts 50, and fill the die cavities and to overflow into runners r if necessary while being heated, and thus to become semi-cured to the degree where the composite article unless forcibly deformed will maintain its shape and size after being discharged from the cavity. The composite articles may be discharged from the die members 38 and 40 when the die members are opened or separated from each other at the end of a cycle and in preparation for the insertion of more nonmoldable members and to receive the work strip 26. The discharged composite articles may be further cured or vulcanized as may be required.

The actuating unit 28 comprises a separate subframe or housing 29, secured by bolts 29a to the part 12 of the carrier 11 and in substantial alignment with the axis of the forming dies 38 and 40 which are in part 14 of the carrier.

The upper portion of the subframe 29 carries a slide bar 33 supporting the cam follower roller 30 for engagement with the cam 31 carried by the cam support 32 mounted on the frame of the machine. The slide bar 33 carries a block 33a having a vertical slot in which rides a roller on a bell crank 33b. The bell crank 33b is pivotally carried by a spring backed abutment bar 33c providing the relatively fixed pivot point of the bell crank 33b. The bell crank 33b has a pivotal connection 33d with a link 38a pivotally connected at 38b to the die member 38 which reciprocates in the bearing ring or flange 34 of the drum carrier part 14. With slide bar 33 in the position shown in FIG. 3 the forming dies 38 are advanced and the pivotal connections between bar 33c, the bell crank 33b and the link 28a are in horizontal alignment so that any force tending to push the die member to open position will necessarily have to move the abutment bar 33c since linkage forms a toggle which is locked in the extended or cavity-closing position of the forming die 38. Unlocking of the toggle mechanism is effected by the follower cam roller 30 being engaged by suitable cam surfaces provided on the supporting structure 32.

The nonmoldable members 50 which are inserted into the cavities in dies 40 in ring 36 are fed into the space 42 between the rings 34 and 36 in advance of the point where dies 38 are successively closed against dies 40. The nonmoldable members are fed from hopper 52 through chute 54 to a loading station 56 where members 50 are stopped momentarily, and then to the discharge end of the chute. Chute 54 is channel shaped in cross section and adapted to provide passage for the nonmoldable members one by one, in edge to edge relation. For this purpose the inner surfaces of the opposed side walls 54a and 54b comprising the chute are grooved with the grooves g adapted to receive the peripheral edges of the nonmoldable members 50 and provide a track in which they travel. The hopper 52 may be of known kind and vibrated by motor 58 to feed the nonmoldable members up the spiral track 60 on its inner surface and into the top of chute 54.

The chute comprises an upper portion 54a which is inclined toward the hollow dies 40 and relative to a vertical plane in which the lower curved portion 54b of the chute lies. The lower portion 54b is curved along the same radius as a line joining the centers of the hollow dies 40. The lower end of the portion 54a extends below the high point of portion 54b. In the side wall 55a of the chute a first slot 62 is provided through which extends a spring arm 65 the upper end of which is fixed to the chute at 66. The lower end of spring arm 65 serves as a stop, holding back the travel of members 50 along the upper part of the curved lower portion 54b of the chute.

Pins 68 extend rearwardly from the portion 41 of hollow dies 40, through the bores $b$ in ring 36 in the rear portion of which the hollow dies are inserted. The free ends of pins 68 extend beyond the front face of ring 36 into contact with cam 70 which is shaped to project the pins rearwardly against the force of springs 72, twice during each rotation of the die carrier 11, first to remove the die 41 successively into the upper part of the opposed lower portion 54b of the chute, between the side walls 55a and 55b thereof, and into contact with the leading edge of members 50 as they reach the bottom of the upper portion of the chute and are stopped by the lower end of spring arm 64, and again later in the cycle to eject the formed composite articles A from the die cavities defined by dies 40 of which die portions 41 are a part, and to dispose the formed composite articles in position to be stripped from the die portions 41 by jets of air introduced into the hollow cavities through passage 73, supplemented if necessary by jets of air directed through nozzles 74.

The face of each of the die portions 41 of hollow dies 40, as shown herein, comprises a raised center 41a surrounded by an offset annular portion 41b which provides a seat for the ring-like nonmolded members 50 illustrated herein. The heads of die portions 41 are magnetized and are preferably permanent magnets, and thus when they contact the members 50, each presented at the lower end of the upper chute portion 54b with a leading edge, the members 50 are attracted to the heads and this force is sufficient for the contacted member to adhere to the faces of die portions 41 and move with the die portions, past the yielding stop provided by the spring arm 64, and around their circular path, until reaching and passing beyond the discharge end of the chute. The pins 68 are then retracted by springs 72 which are now operative because of the shape of cam 70, thus drawing the portions 41 of dies 40 within the surrounding stationary portions of the said dies. Cam 70 is supported from the frame by arm 70a.

As the members 50 move with the die portions 41 along their arcuate path in the chute the initial contact between the die portions 41 and the leading edges of members 50 is increased until the members are fully seated on the annular portions 41b of the die portions 41. The angular presentation of the members 50 to the point of contact with die portions 41 enables the die portions 41 to be projected into the chute at high speed and without necessarily having the exact registry which would be required if the upper portion 54a of the chute were not inclined toward the hollow die cavities in ring 36 and relative to the plane of the lower portion of the chute.

After nonmoldable members 50 have been positioned and seated within the hollow die members 40 the dies 38 are reciprocated, causing slugs to be separated from the strip 26 and inserted into the hollow dies and molded against the inserts 50, as described above.

For insuring the bonding of the moldable material from strip 26 with the nonmoldable inserts 50 the latter may be initially treated with a suitable adhesive. This may be accomplished by spraying the members 50 with adhesive while they are in hopper 52.

The formed composite articles, A, are ejected from the hollow die cavities into the space between rings 34 and 36 by projecting die portions 41 as has been described, after the forming die members 38 have been withdrawn. The composite articles are then separated from the projected die portions 41, for example by air jets as described above, and the cycle is repeated.

The drop arm 76 pivoted at 77 serves to keep a power circuit closed through a micro switch 80 as long as arm finds a member 50 in the chute to rest upon. If it finds none, arm 76 drops down through slot 78 in the chute and micro switch 80 is actuated to shut down the machine. Micro switch 80 is attached to bracket 82 which is also attached to the closed side of chute 54. Bracket 82 is supported by bracket 84 which in turn is supported from support 32 through brackets 92 and 90.

Depending from bracket 82 is the bifurcated arm 86 which carriers roller 88 which rides on ring 34 thereby giving stability to the chute 54, micro switch 80 and the supporting brackets 82, 84, 90 and 92.

There has thus been provided method and apparatus by which the above stated objects are accomplished in a thoroughly practical way.

What is claimed is:

1. The method of forming composite articles comprising nonmoldable portions and moldable portions comprising, feeding nonmoldable members into a chute one at a time, initially advancing the said nonmoldable members with a leading edge along an angular track portion of said chute, stopping said nonmoldable members substantially at the end of the angular track portion between a series of pairs of axially aligned cooperating blanking dies with the nonmoldable members inclined toward one of the dies projecting a portion of said one of the dies successively into said angular track portion and into contact initially with only the leading edge of the inclined nonmoldable members respectively at the stopping point within the chute, utilizing the projected die member portions to move the nonmoldable members successively past the stopping point within the chute and through an arcuate track portion of said chute to the discharge end of the chute while completing the seating of the nonmoldable members on the projected die portions, retracting the projected die portions and utilizing them to carry the contacted nonmoldable members into the die members of which said portions form a part, positioning a strip of moldable material between said aligned die members, moving the die members relatively between open and closed position to blank slugs of moldable materials from said strip and insert them within the dies, and to close the dies, and mold the slugs against nonmoldable members, separating the die members, and again projecting the said portions of the hollow die members to eject the composite article thus formed.

2. The method of claim 1 including the step of attaching the nonmoldable member to the projected die portion magnetically.

3. The method of claim 1 including the step of applying adhesive to the inner face of the nonmoldable portions.

4. The method of claim 1 including the step of vibrating a hopper containing the nonmoldable members to feed the nonmoldable members into said chute.

No references cited.

ROBERT F. WHITE, Primary Examiner

A. M. SOKAL, Assistant Examiner

U.S. Cl. X.R.

264—163, 278, 297